United States Patent Office 3,634,454
Patented Jan. 11, 1972

3,634,454
DERIVATIVES OF PYRROLIDINE
John William Lewis, North Ferriby, and Edward James Ryley Harry, Withernwick, England, assignors to Reckitt & Colman Products Limited, Hull, England
No Drawing. Filed May 7, 1969, Ser. No. 822,690
Claims priority, application Great Britain, May 14, 1968, 22,893/68
Int. Cl. C07d 27/02
U.S. Cl. 260—326.5 M         7 Claims

ABSTRACT OF THE DISCLOSURE

The invention relates to novel derivatives of pyrrolidine of the general formula:

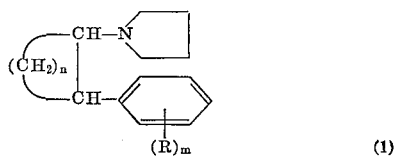

wherein $n$ is an integer selected from the group 3, 4 and 5; $m$ is selected from the group 0 or an integer of 1 or 2; R is selected from the group consisting of methyl and methoxy, and pharmaceutically acceptable salts of the compounds of the said formula.

---

The novel compounds and their salts with pharmaceutically acceptable acids are useful because of their depressant activity on the central nervous system.

This invention relates to novel derivatives of pyrrolidine, their pharmaceutically acceptable salts, to processes for their preparation and to pharmaceutical formulations containing such pyrrolidines and their salts.

According to the present invention there are provided compounds of the following formula:

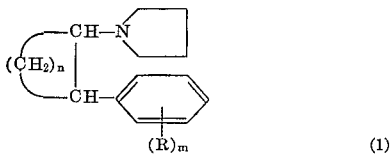

in which $n$ is an integer of 3 to 5, $m$ is 0 or an integer of 1 or 2, R is methyl or methoxy and pharmaceutically acceptable salts of the compounds of the said formula.

Specific examples of compounds as defined above are:

2-phenyl-1-N-pyrrolidino-cyclohexane
2-o-, m- or p-tolyl-1-N-pyrrolidino-cyclohexane
2-phenyl-1-N-pyrrolidino-cyclopentane
2-phenyl-1-N-pyrrolidino-cycloheptane The novel bases and their salts with pharmaceutically acceptable acids are useful because of their depressant action on the central nervous system.

The compounds of Formula 1 may be prepared by the reaction of a ketone of the formula:

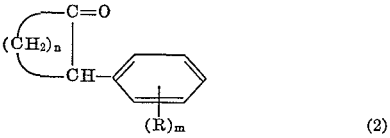

wherein $n$, $m$ and R are as defined above, with pyrrolidine, the reaction either being carried out in the presence of formic acid or the reaction product from the direct reaction of the said ketone with pyrrolidine being reduced, to give the product compound. In the former case, when the reaction is carried out in the presence of formic acid, which is an example of the Leuckart reaction, the compound of Formula 1 is formed directly. In the latter case the initial product formed by the direct reaction of the ketone of Formula 2 with pyrrolidine is an enamine of formula:

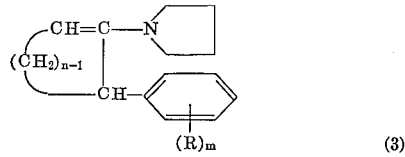

which is then reduced to give the compound of Formula 1. The enamines of Formula 3 may be reduced by catalytic hydrogenation with hydrogen and for example palladium on charcoal or platinum oxide. Alternatively the enamines of Formula 3 may be reduced with formic acid or with sodium borohydride or with mixtures of lithium aluminium hydride and aluminium chloride. These mixtures contain aluminium hydride ($AlH_3$) or the chlorohydrides ($AlHCl_2$ and $AlH_2Cl$) depending on the proportions of the two reagents. Aluminium hydride may also be prepared by the action of anhydrous sulphuric acid on lithium aluminium hydride.

The compounds of this invention may be in the form of the cis or trans isomers. Although the compounds may be employed in accordance with the invention in either form, or as a mixture of these isomeric forms, it is believed that better activity is obtained with the cis isomers. It is also believed that the method of preparation of the pyrrolidine derivatives involving reductive amination of the ketone gives the compound mainly in the cis form.

The invention is illustrated by the following examples:

EXAMPLE 1

2-phenyl-1-N-pyrrolidino cyclohexane (a) A mixture of 2-phenylcyclohexanone (17 g.) and pyrrolidine (7 g.) in dry benzene (150 ml.) was heated under reflux using a Dean and Stark apparatus until there was no further separation of water. Excess pyrrolidine and solvent were removed by distillation under reduced pressure. The product, 6-phenyl-1-N-pyrrolidino-cyclohexene, was used without further purification.

To 6-phenyl-1-N-pyrrolidino-cyclohexene (8 g.) in methanol (50 ml.) was added sodium borohydride (4 g.) and the mixture was allowed to stand overnight at room temperature. Dilute hydrochloric acid was cautiously added and the resulting acidic mixture allowed to stand for 1 hour after which it was extracted with ether. The mixture was basified and then extracted with ether. The dried extract was evaporated down and distilled to give the desired product (6 g.) B.P. 150–154/4 mm.

(b) To aluminium hydride [prepared from lithium aluminium hydride (5.7 g.; 0.15 mole) and aluminium chloride (6.66 g.; 0.05 mole)] in ether (240 ml.) was added 6-phenyl-1-N-pyrrolidinocyclohexene (11.35 g.; 0.05 mole) with stirring. The mixture was allowed to stand for forty eight hours after which it was cooled in ice and acidified with ice-cold dilute hydrochloric acid. After extraction with ether the aqueous solution was strongly basified with solid caustic soda (75 g.) and was then extracted with ether. The ether extract was dried, evaporated and distilled to give the desired product (8 g.), B.P. 178–182/13 mm. $n_D^{23}$ 1.5480.

Analysis.—Found (percent): C, 83.7; H, 10.1; N, 6.0. $C_{16}H_{23}N$ (percent) requires: C, 83.9; H, 10.1; N, 6.1.

(c) 6-phenyl-1-N-pyrrolidinocyclohexene (2 g.) and 98–100% formic acid were heated at 90° C. for two hours. The mixture was cooled and poured into 2 N hydrochloric acid. After extraction with ether the aqueous solution was basified and then extracted with ether. The dried extract was evaporated to give the desired product, isolated as the hydrochloride (1.0 g.) M.P. 176–178° C.

(d) 6-phenyl-1-N-pyrrolidinocyclohexene (2 g.) in ethanol was hydrogenated at room temperature and pressure in the presence of 10% palladium on charcoal until the uptake of hydrogen ceased. The solution was filtered free of catalyst, diluted and acidified with 2 N hydrochloric acid. After extraction with ether, the acidic solution was basified and then extracted with ether. The dried ether extract was evaporated to give the desired product, isolated as the hydrochloride (1.0 g.).

(e) 2-phenylcyclohexanone (4 g.), pyrrolidine (3.3 g.) and 98–100% formic acid were heated under reflux at 130–140° C. for four hours. The cooled mixture was poured into dilute hydrochloric acid, washed with ether, basified, and ether extracted. The dried extract was evaporated to give the desired product, isolated as the hydrochloride (6.1 g.) M.P. 177–178° C.

EXAMPLE 2

2-(p-tolyl)-1-N-pyrrolidinocyclohexane 2-(p-tolyl)cyclohexanone (10 g.) and pyrrolidine (5.5 g.) were heated in benzene under reflux in a Dean and Stark apparatus until the theoretical amount of water was collected. The solvent was removed and the residual enamine dissolved in ethanol, and sodium borohydride (3 g.) was added. The mixture was set aside overnight at room temperature. To the diluted solution was added dilute hydrochloric acid and the resulting acidic mixture was washed with ether, basified and then extracted with ether. The dried extract was evaporated and distilled to give the desired product (6.5 g.) B.P. 145–148° C./0.7 mm.; hydrochloride M.P. 163–167° C.

Found (percent): C, 72.7; H, 9.4; N, 5.0; Cl, 12.5. $C_{17}H_{25}NHCl$ (percent) requires: C, 72.9; H, 9.4; N, 5.0; Cl, 12.7.

EXAMPLE 3

2-(o-tolyl)-1-N-pyrrolidinocyclohexane

This was prepared by the method of Example 2 from 2-(o-tolyl)cyclohexanone (4.4 g.), pyrrolidine (2 g.) and sodium borohydride (1.5 g.). The desired product as the hydrochloride (2.2 g.), had M.P. 220–224° C. decomp.

Analysis.—Found (percent): C, 72.2; H, 9.0; N, 5.1; Cl, 12.5. $C_{17}H_{25}N.HCl$ (percent) requires: C, 72.9; H, 9.3; N, 5.0; Cl, 12.5.

EXAMPLE 4

2-(3′,4′-dimethylphenyl)-1-N-pyrrolidinocyclohexane

This was prepared by the method of Example 2 from 2-(3′,4′-dimethylphenyl) cyclohexanone (4.7 g.), pyrrolidine (2 g.) and sodium borohydride (1.5 g.). The desired product as the hydrochloride (3.2 g.), had M.P. 202–203° C.

Analysis.—Found (percent): C, 73.3; H, 9.7; N, 5.2; Cl, 12.1. $C_{18}H_{27}N.HCl$ (percent) requires: C, 73.5; H, 9.6; N, 4.8; Cl, 12.1.

EXAMPLE 5

2-phenyl-1-N-pyrrolidinocycloheptane

This was prepared by the method of Example 2 from 2-phenylcycloheptanone (7 g.), pyrrolidine (3 g.) and sodium borohydride (1.5 g.). The desired product as the hydrochloride (3.9 g.) had M.P. 172–173° C.

Analysis.—Found (percent): C, 72.6; H, 9.1; Cl, 12.3. $C_{17}H_{25}N.HCl$ (percent) requires: C, 72.9; H, 9.4; N, 5.0; Cl, 12.7.

EXAMPLE 6

2-(4-methoxyphenyl)-1-N-pyrrolidinocyclohexane

This was prepared by the method of Example 2 from 2-(4-methoxyphenyl) cyclohexanone (3.7 g.), pyrrolidine (2.5 g.) and sodium borohydride (1.5 g.). The desired product as the hydrochloride (2.2 g.) had M.P. 183–184° C.

Analysis.—Found (percent): C, 68.9; H, 8.8; N, 4.7; Cl, 12.2. $C_{17}H_{25}NO.HCl$ (percent) requires: C, 69.1; H, 8.8; N, 4.7; Cl, 12.0.

2-phenyl-1-N-pyrrolidinocyclohexane has been found to be a highly potent suppressant of seizures in mice caused by chemical or electrical stimulation of the central nervous system. This is in marked contrast to the corresponding piperidyl and morpholine analogues which have only very weak activity in the electroshock test and strychnine test in mice, discussed below. The table below sets out results obtained for these three compounds, the compounds being administered either subcutaneously (S.C.) or orally (P.O.).

TABLE

| | Pyrrolidyl, $ED_{50}$ mg./kg. | Piperidyl, $ED_{50}$ mg./kg. | Morpholine, $ED_{50}$ kg./kg. |
|---|---|---|---|
| Electroshock test | 1.7 p.o. / 2.4 s.c. | ~60 p.o. | 117.5 p.o. / 155 s.c. |
| Strychnine test | 0.5 p.o. / 3.7 s.c. | >100 p.o. | >100 p.o. / >100 s.c. |

For this reason it may be expected to be of use in pathological conditions such as epilepsy, Parkinson's disease, muscular spasms and nervous disorders in which central reflexes play a fundamental part.

The compounds of the invention may also have tranquilising, sedative and hypnotic effects.

The $ED_{50}$ for 2-phenyl-1-N-pyrrolidinocyclohexane against strychnine-induced seizures in mice is 3.7 mg./kg. when administered parenterally whereas that for mephenesin, a commercial myo relaxant, is 81 mg./kg. For administration to man the expected daily dosage would be in the range 150 or 250 to 400 mg.

The $ED_{50}$ for 2-phenyl-1-N-pyrrolidinocyclohexane against electrically-induced seizures in mice is 1.7 mg./kg. when administered orally compared with an $ED_{50}$ of 3 mg./kg. for the commercial anti-epileptic drug phenytoin by the same route. For the treatment of epilepsy the daily dosage of 2-phenyl-1-N-pyrrolidinocyclohexane would be expected to be in the range 50–100 mg.

It is to be understood that the present invention also includes pharmaceutical compositions comprising a pyrrolidine derivative as defined above. In general, the pharmaceutical compositions may be administered orally, as tablets or in capsules. A tablet will contain a pharmaceutically acceptable carrier for the compound which is preferably present in the form of a solid salt. The compound may be present in a capsule in solid or liquid form. The compositions may be in the form of unit dosages which may contain from 50 to 150 mg. of the derivative of pyrrolidine.

It may be advantageous to administer the compounds of this invention to patients in combination with other active ingredients, and one type of active ingredient is a sedative such as a depressant for the central nervous system, e.g. a barbiturate.

We claim:

1. A compound of the formula:

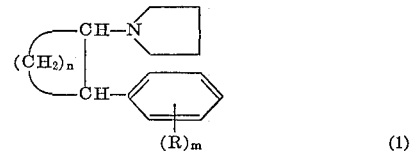

where $n$ is an integer selected from the group 3, 4 and 5;

$m$ is selected from the group 0 or an integer of 1 or 2;

R is selected from the group consisting of methyl and methoxy, and pharmaceutically acceptable salts of the compounds of the said formula.

2. 2-phenyl-1-N-pyrrolidino-cyclohexane.

3. 2-(p-tolyl)-1-N-pyrrolidino-cyclohexane.

4. 2-(o-tolyl)-1-N-pyrrolidino-cyclohexane.
5. 2-(3',4'-dimethylphenyl)-1-N - pyrrolidinocyclohexane.
6. 2-phenyl-1-N-pyrrolidinocycloheptane.
7. 2-(4-methoxyphenyl)-1-N-pyrrolidinocyclohexane.

References Cited

UNITED STATES PATENTS 3,192,219   6/1965   Maddox et al. _____ 260—293

OTHER REFERENCES

Wagner et al.: Synthetic Organic Chemistry (1953), pp. 662–4.

NICHOLAS S. RIZZO, Primary Examiner

J. A. NARCAVAGE, Assistant Examiner

U.S. Cl. X.R.

260—326.81, 326.87; 424—274